(12) United States Patent
Lefranc

(10) Patent No.: US 7,317,384 B2
(45) Date of Patent: Jan. 8, 2008

(54) OPTICAL EXPLORATION DEVICE AND VEHICLE COMPRISING SAID DEVICE

(75) Inventor: Francis Lefranc, Suresnes (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 234 days.

(21) Appl. No.: 10/555,366

(22) PCT Filed: Apr. 20, 2004

(86) PCT No.: PCT/FR2004/050161

§ 371 (c)(1),
(2), (4) Date: Nov. 2, 2005

(87) PCT Pub. No.: WO2004/099742

PCT Pub. Date: Nov. 18, 2004

(65) Prior Publication Data

US 2006/0072223 A1  Apr. 6, 2006

(30) Foreign Application Priority Data

May 7, 2003   (FR)  .................................. 03 05566

(51) Int. Cl.
*B60Q 1/00* (2006.01)

(52) U.S. Cl. ...................... 340/436; 340/933; 340/942; 340/425.5; 340/438

(58) Field of Classification Search ................ 340/933, 340/942, 425.5, 426.24, 438
See application file for complete search history.

(56) References Cited

U.S. PATENT DOCUMENTS

| 5,518,176 | A | * | 5/1996 | Turner et al. | ............... | 236/49.3 |
| 5,762,298 | A | * | 6/1998 | Chen | ........................ | 244/172.7 |
| 5,984,239 | A | * | 11/1999 | Chen | ........................ | 244/172.7 |
| 6,045,089 | A | * | 4/2000 | Chen | ........................ | 244/12.1 |
| 6,195,020 | B1 | * | 2/2001 | Brodeur et al. | ............. | 340/933 |
| 2002/0126002 | A1 | | 9/2002 | Patchell | | |

FOREIGN PATENT DOCUMENTS

| EP | 1162478 A | 12/2001 |
| WO | WO 9927335 A | 6/1999 |

* cited by examiner

*Primary Examiner*—Daryl C Pope
(74) *Attorney, Agent, or Firm*—Nicolas E. Seckel

(57) ABSTRACT

The invention relates to an optical exploration device, particularly for the detection of the blind spot of a vehicle, comprising first passive thermal infrared detection means (2) of the thermopile variety, for example, having a sensitivity range within a first wavelength interval (1), second detection means (3) used to measure direct or indirect solar energy (5) within a second wavelength interval (12), characterized in that the first and second (12) wavelength intervals partially overlap, and in that the first (2) and second (3) detection means are disposed and are oriented in a relative manner in order to successively or simultaneously sight the same are of detection (Z). The invention also relates to a vehicle comprising said device.

17 Claims, 4 Drawing Sheets

Figure 2:
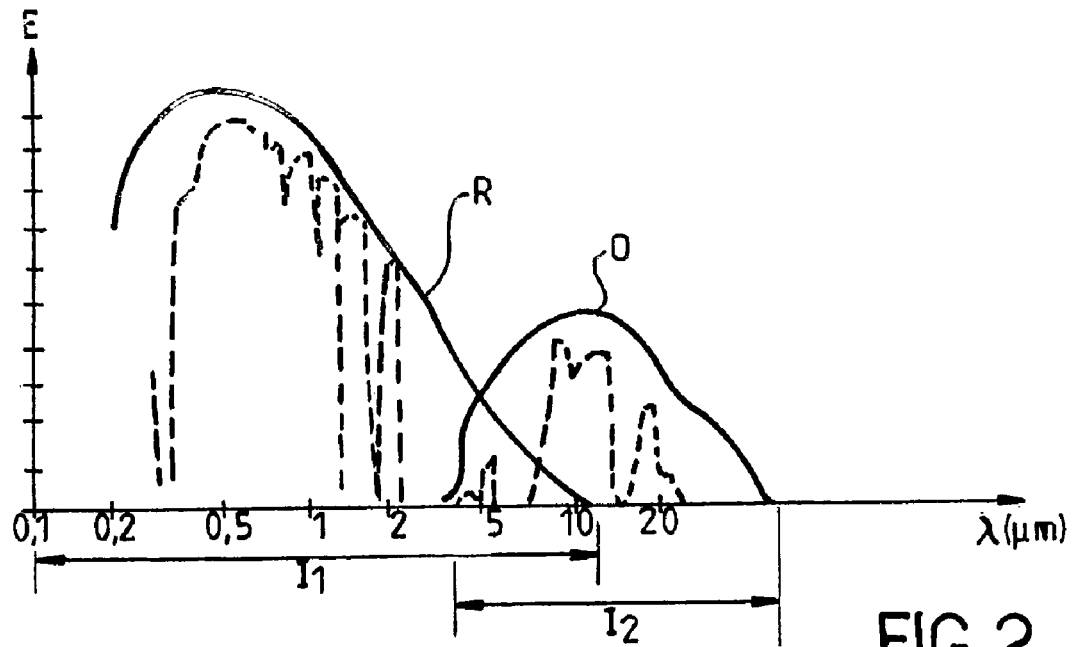

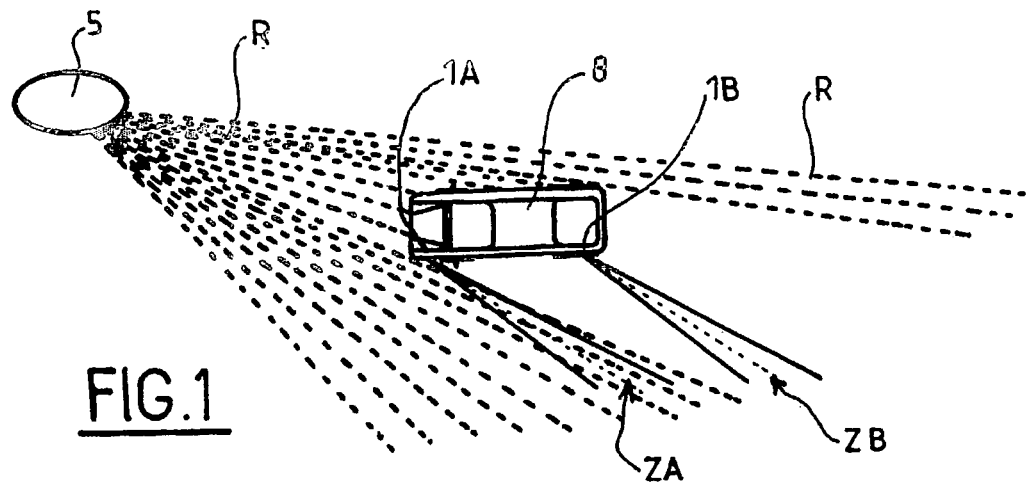
FIG.1
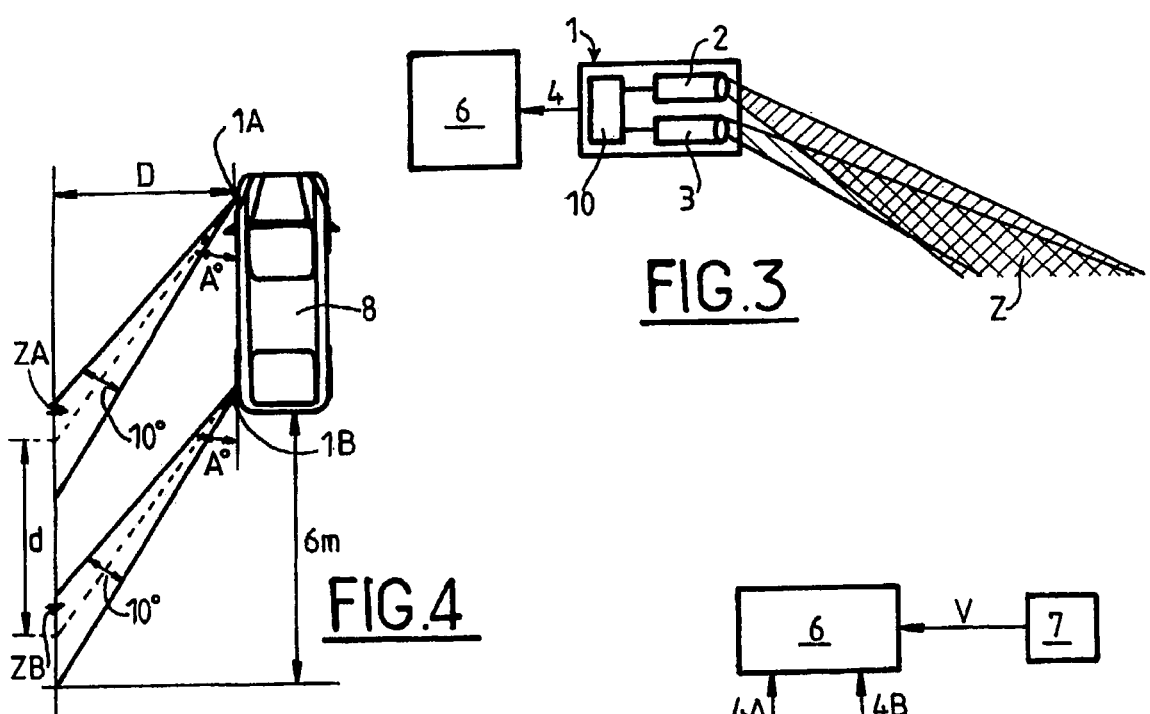
FIG.3
FIG.4
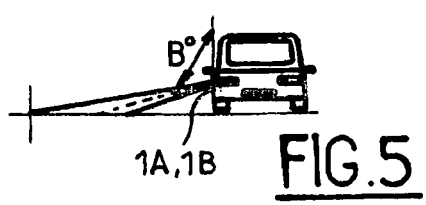
FIG.5
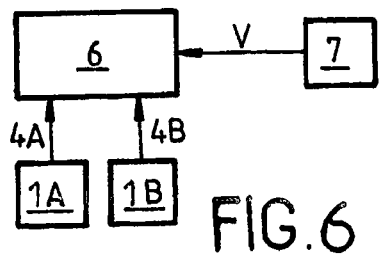
FIG.6

OPTICAL EXPLORATION DEVICE AND VEHICLE COMPRISING SAID DEVICE

The invention relates to an optical exploration device as well as to a vehicle comprising such a device.

The invention concerns more particularly an optical exploration device, in particular for the detection of the blind spot of a vehicle, comprising first passive thermal infrared detection means (2), for example, of the thermopile type, having a sensitivity range in a first wavelength interval (1), second detection means (3) intended to measure the direct or indirect solar energy (5) in a second wavelength interval (12), the device providing an exit signal (4) which is a function of the measurements of the first (2) and second (3) detection means.

Thermopiles are infrared thermal sensors having a wavelength sensitivity comprised, for example, between 0 and 14 µm approximately. These passive sensors convert a detected temperature in a sighting zone and convert it into an electric signal. These thermopile sensors measure an absolute temperature, i.e., they do not need to measure a temperature variation.

The documents EP847519 and WO9525322 describe optical exploration devices for vehicles using infrared sensors of the thermopile type.

A problem encountered in the use of these devices resides in the fact that parasitic detections can be frequent, in particular because of the sun radiation. Indeed, the heat source diffused by the sun and reflected by a road pavement or another object can cause an erroneous detection of an obstacle.

To remedy this problem, the device described in document EP847519 compares the measures made in one or several exploration zones with a reference zone. The document US2002/126002A1 also describes such a device, conform to the preamble of the main claim. However, this solution is not totally satisfactory because in some configurations with direct or indirect sun radiation, parasitic detections can subsist.

Indeed, FIG. 1 shows schematically, and as an example, a vehicle comprising two sensors 1A, 1B exploring two distinct zones ZA, ZB, respectively. As a function of the relative position of the sun 5, of the sensors 1A, 1B, and of the detection zones ZA, ZB, the thermal measurements corresponding to the two zones ZA, ZB, respectively, can be different and representatives of the intrusion of a hot object such as a vehicle. In the example shown, the front sensor detects a hot object (sun rays) whereas the rear sensor does not see it. This bad detection reliability remains valid by analogy when a single sensor explores one or a plurality of adjacent zones.

Another solution known from document WO9525322 consists in taking into account (by filtering) only measurements located beyond a threshold calculated as a function of meteorological conditions. More precisely, the threshold is raised or lowered as a function of the number of "parasitic noises" detected over a reference zone and during a reference period. The device described in document US2002/126002A1 also uses the measurement of the radiation in a reference zone to adapt an alert threshold accordingly.

This solution does not solve any better the problem of parasitic detections due to certain configurations of the direct and indirect sun radiations. Further, solutions which implement a filter to suppress the sun radiation are exposed to a more serious consequence which is the non-detection of a real object. Indeed, as shown on FIG. 2, the sun radiation R emits signals in the zone O in which an object such as a vehicle is also likely to emit a radiation.

An objective of the present invention is to remedy all or a portion of the drawbacks of the prior art as mentioned above.

To this effect, the exploration device according to the invention, which is otherwise confirm to the generic definition given in the preamble above, is essentially characterized in that the first and second wavelength intervals overlap in part, and in that the first and second detection means are disposed and oriented relatively so as to aim successively or simultaneously at a same detection zone.

Further, the invention can comprise one or several of the following characteristics:

- at least a portion of the exit signal provided by the device comprises a subtraction and/or a comparison of the signals representative of the intensity detected by the first and the second detection means, respectively, at at least a same wavelength located in the overlap portion of the first and second intervals,
- the second detection means are of the photodiode and/or phototransistor and/or photoresistance type,
- the overlap range between the first and the second wavelength intervals is comprised between 0 and 14 µm approximately, and preferably between 0 and 8 µm approximately, The invention also concerns a vehicle comprising at least an exploration device conform to any one of the above characteristics.

Figure 7:
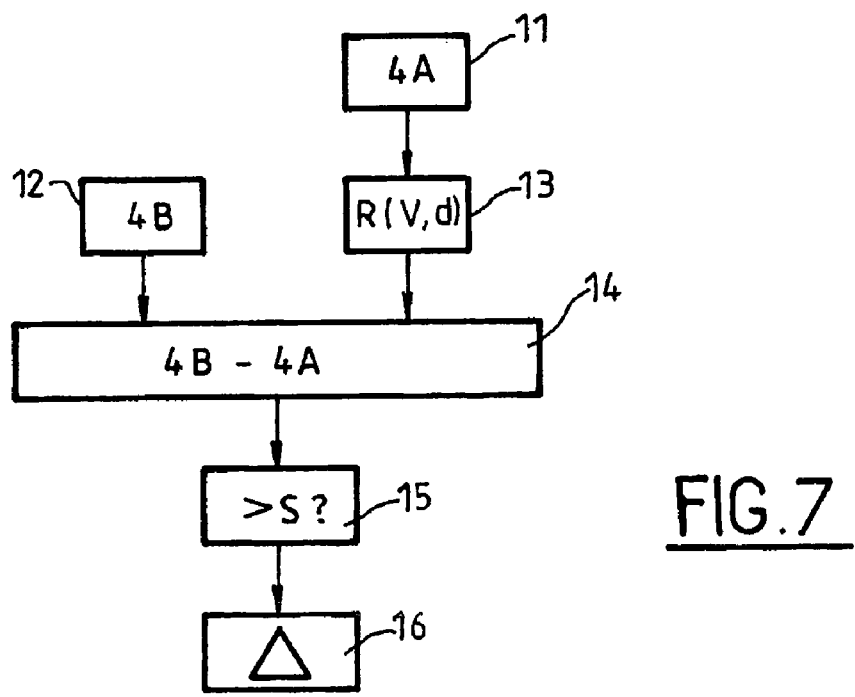
Figure 8:
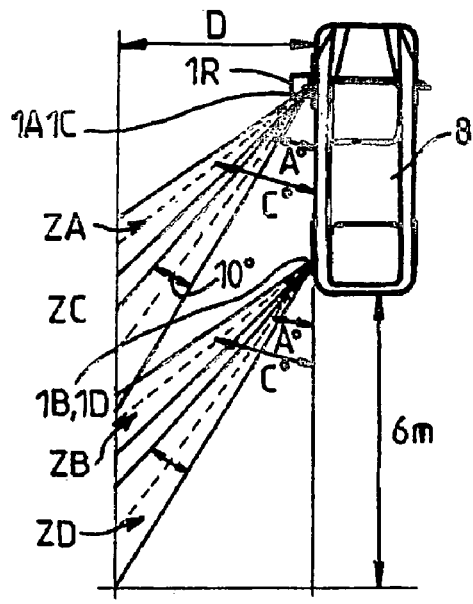
Figure 9:
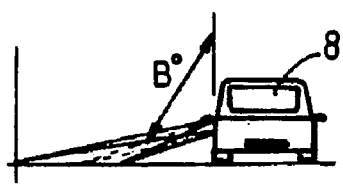
Figure 10:
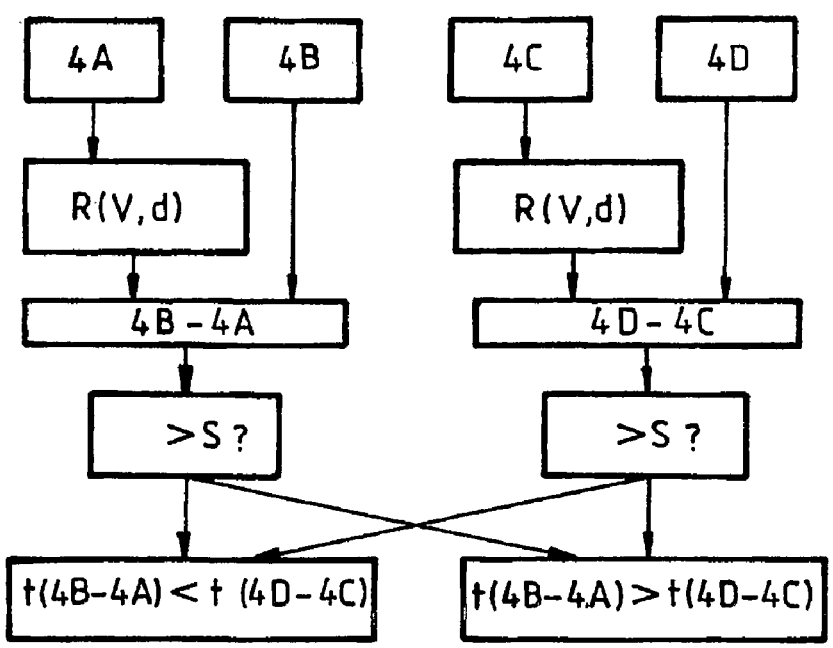
Figure 11:
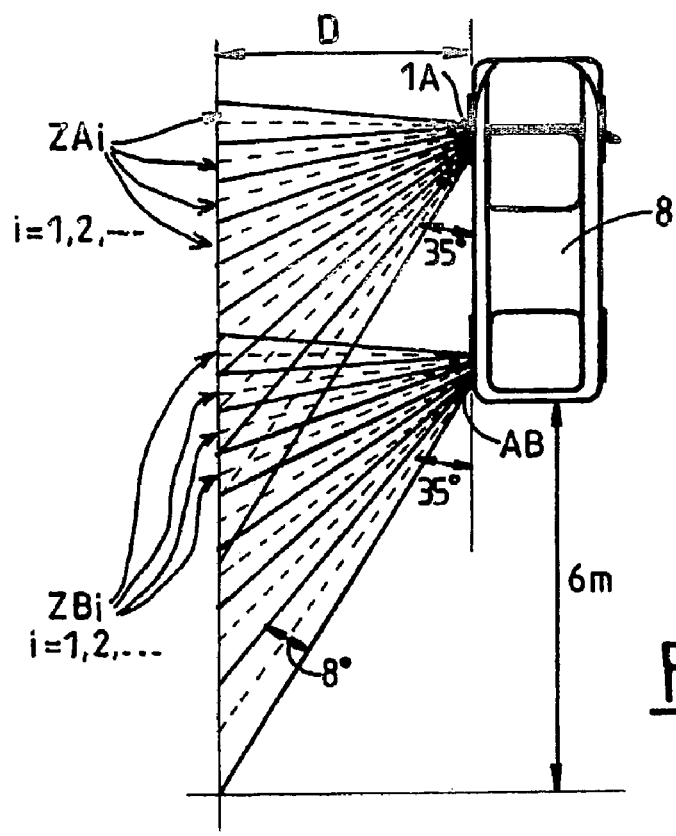
Figure 12:
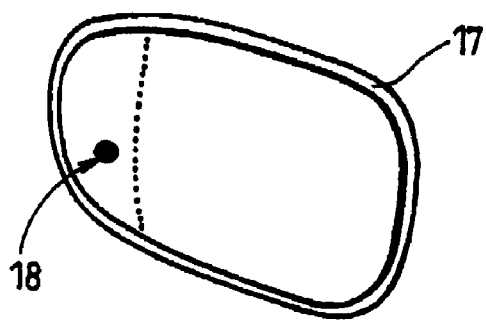
Figure 13:
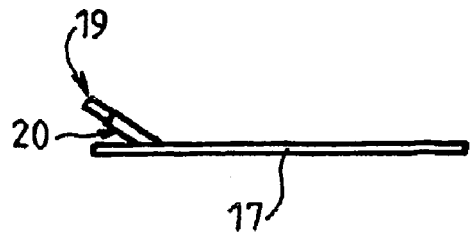

According to other advantageous particularities of the invention:

- the exploration axis of the waves of the device is oriented essentially toward the rear of the vehicle and forms with the longitudinal axis of the vehicle an angle comprised between 10° and 170° approximately, and preferably in the order of 30° to 50° approximately,
- the exploration axis of the waves of the device is oriented essentially toward the ground and forms with the vertical axis an angle comprised between 90° and 180° approximately, and preferably in the order of 100°.
- the vehicle comprises at least two optical exploration devices disposed in a staggered manner along its longitudinal direction,
- the vehicle comprises at least two detection devices oriented so as to aim successively at a same detection zone, the vehicle comprising means for determining the vehicle speed, and means for data processing of the exit signals of the detection devices conformed to synchronize the exit signals of the detection devices as a function of the spacing distance between the sighting zones of the latter and of the vehicle speed, to subtract or compare the signals and eliminate the fixed objects from the detection zone,
- the vehicle comprises a plurality of detection device, the two detection devices of each pair being staggered along the longitudinal direction of the vehicle and oriented relatively so as to aim successively at a same detection zone, the pairs of detection device being conformed so as to aim successively.
- the vehicle comprises at least a pair of detection devices, each detection device emitting a plurality of exploration beams, the beams of two devices being associated by pairs, respectively, so as to aim successively at a plurality of distinct respective zones,
- the vehicle comprises at least one reference detection device, oriented so as to aim at the ground essentially vertically, the means for data processing are conformed so as to compare the difference between the exit signals of two detection devices having swept successively the same zone, to determine the presence of a mobile object, the means for data processing perform the comparison in time of the exit signals of two detection devices that sweep successively adjacent zones, to determine the direction of movement, if appropriate, of a mobile object crossing the detection zones, Other particularities and advantages will appear by reading the description below made in reference to the Figures in which:

FIG. 1 is a schematic view from above of a vehicle comprising two optical exploration devices, FIG. 2 is a view of an example of distribution of the energy of E radiation of the sun R and of an object O as a function of the wavelength λ, FIG. 3 is a schematic view of the structure of an exploration device according to the invention, FIGS. 4 and 5 are views respectively from above and from behind of a vehicle comprising two exploration devices according to the invention, FIG. 6 is a schematic view of the means for processing the measurement made by the two exploration devices of the vehicle of FIGS. 4 and 5, FIG. 7 is a flow chart illustrating schematically the processing of the measurement made by the two exploration devices of the vehicle of FIGS. 4 and 5, FIGS. 8 and 9 are views respectively from above and from behind of a vehicle comprising two exploration devices according to the invention conformed each to explore two distinct detection zones, FIG. 10 is a flow chart illustrating schematically the processing of the measurements made by the two exploration devices of the vehicle of FIGS. 8 and 9, FIG. 11 is a view from above of a vehicle comprising two exploration devices according to the invention, conformed each to explore a plurality of distinct detection zones, FIGS. 12 and 13 are views respectively in perspective and in cross section of the rear-view mirror of the vehicles of FIGS. 4, 5, 8, 9, and 11.

The optical exploration device 1 shown on FIG. 3 comprises first passive thermal infrared detection means 2, such as one or several thermopiles, having a sensitivity range in a first wavelength interval 11. The thermopile 2 has, for example, a wavelength sensitivity comprised between 0 and 14 μm approximately.

According to the invention, the exploration device 1 comprises second detection means 3 intended to measure the direct or indirect solar energy 5 in a second wavelength interval 12 that overlaps in part the first wavelength interval 11 (cf. FIG. 2).

The second detection means 3 are constituted, for example, by one or several photodioide and/or phototransistor and/or photoresistance. For reasons of simplification, the second detection means 3 will be called "second sensor" in the rest of the description. The second sensor 3 has a wavelength sensitivity comprised, for example, between 0.1 and 40 μm approximately, and preferably between 0.1 and 8 μm.

The thermopile 2 and the second sensor 3 can be associated each to a lens intended to define a detection angle. Similarly the thermopile 2 and the second sensor 3 can be associated each to a filter 10 intended to mark the boundaries of their sensitivity range. The thermopile 2 and the second sensor 3 can share the same lens and/or the same filter.

The lens can make it possible to obtain a vision angle comprised between 1 and 180 degrees, for example. Preferably, the thermopile 2 and the second sensor 3 have each a vision angle in the order of 10 degrees approximately (horizontally and vertically).

Preferably, the thermopile 2 and the second sensor 3 are disposed in a parallel manner, the detection angles being parallel or slightly staggered. The thermopile 2 and the second sensor 3 are oriented relatively so as to aim successively or simultaneously at a same detection zone Z. In addition, the distance between the thermopile 2 and the second sensor 3 is small as compared to the distance between the device 1 and the detection zone Z.

According to this configuration, the device 1 can provide an exit signal 4 which is a function of the measurements by the thermopile 2 and by the second sensor 3. The coupling of these two measurements made over a common sensitivity interval makes it possible for the device 1 to determine whether there is presence or not of radiation of the solar type in the detection zone Z and thus to avoid erroneous detections. Indeed, the device makes it possible to verify whether the detected radiation is due to a hot object and to the sun or only to the sun, or only to a hot object.

As shown on FIG. 3, the exit signal 4 can be provided to a means 6 for processing data such as a computer. In a variant, the computer 6 can be part of the device 1.

At least a portion of the exit signal 4 provided by the device 1 can comprise a subtraction and/or a comparison of the signals representative of the intensity detected by the thermopile 2 and by the second sensor 3, respectively, at at least a same wavelength located in the overlap portion of the first 11 and second 12 intervals.

Preferably, the energy measured by the second sensor 3 is subtracted for the energy measured by the thermopile 2 and, in the case where the result obtained is above a determined threshold, the device can conclude in a reliable and secure manner that a "hot" object is present in the zone Z, independently from any direct or indirect solar radiation.

FIGS. 4 and 5 illustrate a first exemplary embodiment of the invention on a motor vehicle 8. The vehicle 8 comprises two optical exploration devices 1A, 1B conform to the description above. The two devices 1A, 1B are disposed in a staggered manner along the longitudinal direction of the vehicle and distant from each other by a distance preferably above 1 m. As shown, the two sensors 2, 3 can be disposed on a same side of the vehicle 8.

The exploration axes of the devices 1A, 1B are oriented essentially toward the rear of the vehicle and form with the longitudinal axis of the vehicle an angle A comprised between 10° and 170° approximately, and preferably in the order of 35°.

The exploration axes of the devices 1A, 1B are oriented essentially toward the ground and form with the vertical axis an angle B comprised between 90° and 180° approximately, and preferably in the order of 100°.

The two detection devices 1A, 1B are oriented so as to aim successively at a same detection zone ZA=ZB located preferably at a lateral distance D from the vehicle comprised between 0.5 and 5 m.

The vehicle 8 comprises processing means 6 such as a computer and means 7 for determining speed V such as a speed sensor connected to the computer 6 (FIG. 6). In this manner, the exit signals 4A, 4B of the two detection devices 1A, 1B are provided to the computer 6 which synchronizes them as a function of the known spacing distance d between the sighting zones ZA, ZB of the two devices 1A, 1B and of the speed V of the vehicle.

This synchronization of the signals 4A, 4B makes it possible for the computer 6 to subtract and/or compare the signals 4A, 4B representative of the same detection zone Z, so as to eliminate the fixed objects detected (bridge, wall, sign, . . . ).

FIG. 7 illustrates schematically an example of processing of data issued from the two devices 1A, 1B by the computer 6.

During a first step 11, the first device 1A measures the radiation in the zone ZA at a first time and provides a corresponding exit signal 4A.

The second device 1B measures subsequently the radiation in the adjacent zone ZB and provides a corresponding exit signal 4B (step 12). The computer 6 calculates the delayed measurement of the first device 1A as a function of the speed V of the vehicle and of the longitudinal spacing distance d between the detected zones ZA and ZB (step 13), so as to subtract at the subsequent step 14 the signals 4A, 4B corresponding to the same detection zone (ZA=ZB). The computer 6 can then compare the result of this subtraction with a threshold value S (step 15). In the case where this result 4A-4B is above the threshold value S, the computer 6 can trigger an alert signal (step 16), to warn the driver of the presence of an object in the detected zone.

The data processing means 6 can also determine the direction of intrusion of an object in the detection zone Z, i.e., the direction of movement of the object as compared to vehicle 8. This direction of movement can be determined by the processing means 6, either by using the sign (positive or negative) of the result 14 of the subtraction of the signals 4A, 4B corresponding to the same detection zone, or by determining temporally the zone in which (ZA or ZB) the object is detected first.

FIGS. 8 and 9 illustrate another embodiment of the invention in which the vehicle 8 comprises five exploration devices 1A, 1B, 1C, 1D, and 1R disposed on a same side of the vehicle. Two devices 1A, 1C are mounted at the front of the vehicle, for example, in one rear-view mirror, and two other devices 1B, 1C are disposed essentially at the rear of the vehicle, for example, in a rear light.

A first front device 1A is associated with a first rear device 1B so as to aim successively at the same detection zone ZA=ZB. These two devices 1A, 1B each have exploration axes oriented essentially toward the rear of the vehicle and forming with the longitudinal axis of the vehicle an angle C comprised between 10° and 170° approximately, and preferably in the order of 50°.

A second front device 1C is associated with a second rear device 1D, so as to aim successively at the same detection zone ZC=ZD. These two devices 1C, 1D each have exploration axes oriented essentially toward the rear of the vehicle, and form with the longitudinal axis of the vehicle an angle A comprised between 10° and 170° approximately, and preferably in the order of 35°.

The detection zones ZA, ZB, ZC, ZD of the four devices are located preferably at a lateral distance D from the vehicle in the order of 4 m approximately, The four detection devices are thus associated by pairs (1A, 1B; 1C, 1D). the detection devices of each pair aim successively at a same detection zone.

The fifth detection device 1R, which is optional, is oriented so as to aim at the ground, essentially vertically from the rear-view mirror, so as to provide a reference detection intended, for example, to be compared to the measurements by the other devices, to provide the temperature of the road pavement, . . . . The reference device 1R can be particularly advantageous to make it possible to detect a vehicle that is stagnating between or over two adjacent detection zones of the other devices, by comparison of its measurement with the measurements of the other devices.

FIG. 10 illustrates the processing of the measurements made by the four first devices 1A, 1B, 1C, 1D by the data processing means.

As previously, after the measurement of the thermal radiation in the four zones ZA, ZB, ZC, ZD at a first time, the four first devices 1A, 1B, 1C, 1D provide signals 4A, 4B, 4C, 4D, respectively.

The computer 6 calculates the delayed measurements of the front devices 1A, 1C as a function of the speed V of the vehicle and of the longitudinal spacing distance between the corresponding pairs of detected zones ZA, ZB, and ZC, ZD. The computer can subsequently subtract the signals 4B-4A; 4D-4C corresponding to a same detection zone ZA=ZD. In the case where the results of these subtractions are above a determined threshold S, there is presence of an object in the zone concerned. Further, the computer 6 can determine the direction of intrusion of the object by determining whether the intrusion has taken place (instant t) before (t(4B-4A)<t (4D-4A)) in the front zone ZA=ZB monitored by the first pair of devices 1A, 1B, or before (t(4B-4A)>t(4D-4C)) in the rear zone ZC=ZD, monitored by the second pair of devices 1C, 1D (FIG. 10).

The data processing means 6 conclude to the presence of an object in proximity of the vehicle, the comparison of the measurement of the reference device 1R with the measurements of the other devices can make it possible to follow the relative movement of that object by reference to the vehicle 8 with an even greater reliability and precision.

In still another variant embodiment shown on FIG. 11, a vehicle can comprise two optical exploration devices 1A, 1B each emitting a plurality of exploration beams ZAi, ZBi (I=1 0 n; with n being an integer above 1).

The beams ZAi and ZBi of the two devices ZA1 and ZA2 are associated respectively by pairs so as to aim successively at a plurality of respectively distinct zones. In other words, the beams Zai of a first device 1A are associated respectively with the beams ZBi of the second device 1B, so as to aim successively at a plurality of respective distinct zones.

The processing of the signals measured can be analogous to that described above in reference to the other embodiments.

Thus, one can envision that the optical exploration device according to the invention, while it has a simple and inexpensive structure, makes it possible to have a reliable detection of an object in an exploration zone, even in the case of direct or indirect solar radiation. The optical exploration device can also advantageously be associated with means for alerting such as a light signal 18 located in the rear-view mirror 17. The light signals can be obtained, for example, by a source of light such that one or several diodes disposed in a guide 20 oriented toward the conductor. The guide 20 is inclined, for example, according to an angle of about 25 degree as compared to the plane of the mirror pane of rear-view mirror 17.

The invention claimed is:

1. Optical exploration device, in particular for the detection of the dead spot of a vehicle, comprising first passive thermal infrared detection means, of the thermopile type, for example, having a sensitivity range in a first wavelength interval, second detection means intended to measure direct or indirect solar energy in a second wavelength interval, the device providing an exit signal that is a function of the measurements by the first and the second detection means, wherein the first and second wavelength interval overlap in part, and in that the first and second detection means are located and oriented relatively so as to aim successively or simultaneously at a same detection zone.

2. Device according to claim 1, wherein at least a portion of the exit signal provided by the device comprises a subtraction and/or a comparison of the signals representative of the intensity detected by the first and by the second detection means, respectively, at at least a same wavelength located in the overlap portion of the first and second intervals.

3. Device according to claim 1, wherein the second detection means (3) are of the photodiode and/or phototransistor and/or photoresistance type.

4. Device according to claim 1, wherein the overlap range between the first and the second wavelength intervals is comprised between 0 and 14 μm approximately.

5. Motor vehicle comprising at least one optical exploration device according to claim 1.

6. Motor vehicle according to claim 5, wherein the exploration axis of the waves of the device is oriented essentially toward the rear of the vehicle and forms with the longitudinal axis of the vehicle an angle comprised between 10° and 170° approximately.

7. Vehicle according to claim 5, wherein the exploration axis of the waves of the device is oriented essentially toward the ground and forms with the vertical axis an angle comprised between 90° and 180° approximately.

8. Vehicle according to claim 5, which comprises at least two optical exploration devices (1A, 1B) disposed in a staggered manner along the longitudinal direction of the vehicle.

9. Vehicle according to claim 5, which comprises at least two detection devices oriented so as to aim successively at a same detection zone, the vehicle comprising means for determining the speed of the vehicle, and means for data processing of the exit signals of the detection devices conformed to synchronize the exit signals of the detection devices as a function of the spacing distance between the sighting zones of the latter and of the speed of the vehicle, to subtract or compare the signals and eliminate the fixed objects from the detection zone.

10. Vehicle according to claim 5, which comprises a plurality of pairs of detection devices, the two detection devices of each pair being staggered along the longitudinal direction of the vehicle and oriented relatively so as to aim successively at a same detection zone, the pairs of detection devices being conformed to aim at adjacent and distinct zones.

11. Vehicle according to claim 5, which comprises at least a pair of detection devices, each detection device emitting a plurality of exploration beams, the beams of the two devices being associated respectively by pairs so as to aim successively at a plurality of respective distinct zones.

12. Vehicle according to claim 9, which comprises at least one reference detection device, oriented so as to aim at the ground essentially vertically.

13. Device according to claim 9, wherein the data processing means are conformed to compare the difference between the exit signals of two detection devices having swept the same zone successively, to determine the presence of a mobile object.

14. Vehicle according to claim 13, wherein the data processing means perform the temporal comparison of the exit signals of two detection devices sweeping successively adjacent zones, to determine the direction of movement, if appropriate, of a mobile object crossing the detection zones.

15. Device according to claim 4, wherein the overlap range between the first and the second wavelength intervals is comprised between 0 and 8 μm approximately.

16. Motor vehicle according to claim 6, wherein the exploration axis of the waves of the device is oriented essentially toward the rear of the vehicle and forms with the longitudinal axis of the vehicle an angle in the order of from 30° to 50° approximately.

17. Vehicle according to claim 6, wherein the exploration axis of the waves of the device is oriented essentially toward the ground and forms with the vertical axis an angle in the order of 100°.

* * * * *